United States Patent [19]
Kyrkjebø

[11] Patent Number: 6,016,767
[45] Date of Patent: *Jan. 25, 2000

[54] FISH FEEDING INSTALLATION

[75] Inventor: Jan Erik Kyrkjebø, Søreidgrend, Norway

[73] Assignee: Feeding Systems A/S, Bergen, Norway

[*] Notice: This patent issued on a continued prosecution application filed under 37 CFR 1.53(d), and is subject to the twenty year patent term provisions of 35 U.S.C. 154(a)(2).

[21] Appl. No.: 08/952,829

[22] PCT Filed: Jun. 22, 1995

[86] PCT No.: PCT/NO95/00110

§ 371 Date: Dec. 9, 1997

§ 102(e) Date: Dec. 9, 1997

[87] PCT Pub. No.: WO96/38038

PCT Pub. Date: Dec. 5, 1996

[30] Foreign Application Priority Data

May 29, 1995 [NO] Norway ................................. 952103

[51] Int. Cl.[7] .................................................. A01K 61/02
[52] U.S. Cl. .................................................. 119/51.04
[58] Field of Search ................................. 119/200, 207, 119/210, 212, 230, 51.04

[56] References Cited

U.S. PATENT DOCUMENTS

| | | | |
|---|---|---|---|
| 4,359,014 | 11/1982 | Molaug et al. | 119/51.04 |
| 4,372,252 | 2/1983 | Lowry, Jr. | 119/51.04 |
| 4,799,459 | 1/1989 | Yi-Tung | 119/51.04 |
| 4,967,697 | 11/1990 | Lau | 119/51.04 |

*Primary Examiner*—Thomas Price
*Attorney, Agent, or Firm*—McAulay Nissen Goldberg Kiel & Hand, LLP

[57] ABSTRACT

The feeding installation is provided with a floating module which has a downwardly directed frusto-conical portion defining at least one silo for receiving feedstuff. A vertical shaft is disposed centrally within the module and extends from above a transfer hold in which remotely controlled dosing equipment is housed. A conveyor pipe extends upwardly within the vertical shaft in order to transfer feedstuff from the silo(s) via the dosing equipment to a distribution valve which selectively delivers the feedstuff to one or more transport hoses directed to fishing ponds. In one embodiment, the module is provided with a pair of side sections spaced on opposite sides of a middle main section. In another embodiment, the side sections which provide holds for equipment or the like are incorporated into a square shape module.

16 Claims, 4 Drawing Sheets

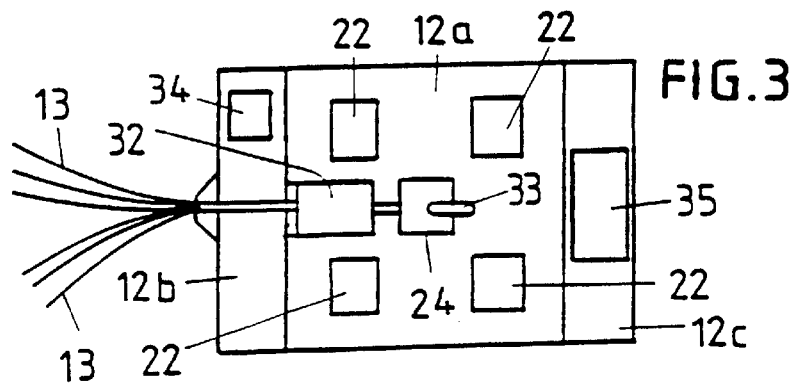
FIG. 3
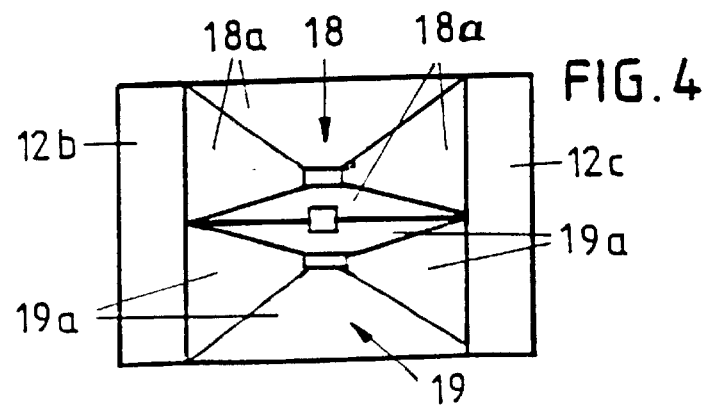
FIG. 4
FIG. 5
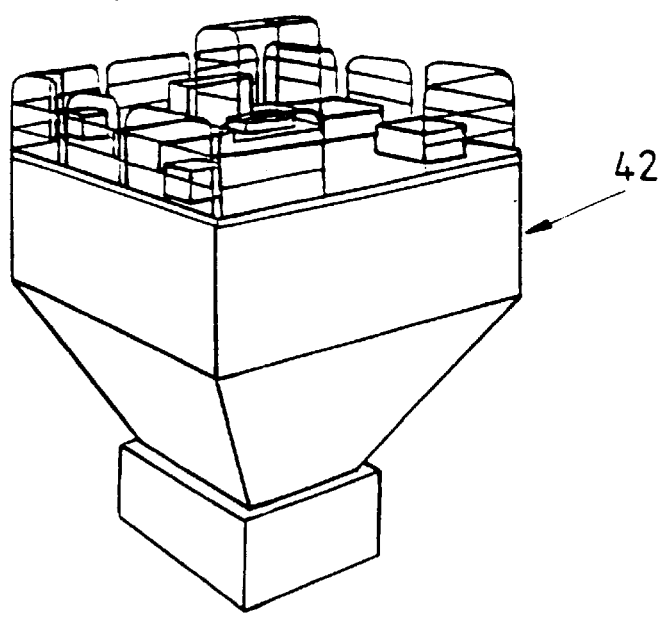

FISH FEEDING INSTALLATION

This invention relates to a feeding installation, which handles feedstuff in the form of any feed and which is arranged as a floating module at sea.

In U.S. Pat. No. 4,372,252 a feeding installation is shown, which handles wet feed and which is arranged on land. There is employed a pump with associated pressure conduits for conveying a current of water centrally downwards through an upwardly opening feedstuff silo to a discharge at the bottom portion of the feedstuff silo, where the feedstuff is admixed with the current of water, the feedstuff being carried along in the water current and led via a transport conduit from the bottom portion of the silo to suitable feeding locations (fish pools).

In GE 2,000,421 a feeding installation is shown, which handles dry feed supplied from one or more separate silos, which are arranged in a module submersible in the sea, that is to say in a module submersible in the fish pool itself. The dry feed, for example in the form of feed meal, is dosed from the silo(s) via a valve arrangement directly out into the fish pool by means of compressed air.

In U.S. Pat. No. 4,799,459 a feeding installation is shown, which handles dry feed and which is arranged in a floating module at sea. The module comprises a feedstuff silo arranged centrally in the latter, which is connected below via a discharge opening to two separate feed openings to their respective separate transport conduits for distribution of feedstuff to their respective fish pools. The feedstuffs are pressed by means of a remotely controlled feed arrangement, which is arranged between the discharge opening and the feed openings, inwardly into and through respective transport conduits to the feeding location. The illustrated feeding installation is based on a fully automated operation, without a need for manual working or manual access to the feed arrangement. The module shown is adapted to be controlled as required in a variety of angular positions on the surface of the sea for the supply of feedstuff to different fish pools. However the module is badly suited for use at employment locations at sea exposed to the weather, where the module can be exposed to heavy wind and ocean forces in a relatively high floating feeding installation.

With the present invention the aim is a feeding installation of the afore-mentioned type, which is specially designed for employment at locations of use exposed to weather and wind, especially at locations along the coast towards the ocean, where the module can stand being exposed to heavy wind and ocean forces and can nevertheless be operated with great dependability, in a fully automated, remotely controlled manner known per se. More especially the aim is a module which exhibits favourable features at sea, having great stability, low weight and concentrated, favourable weight distribution in the module.

In addition the aim is a solution which gives easier access to vital parts of the feeding installation for inspection and possible repair, when this is necessarily required, even with feedstuff occupying the silo(s).

The feeding installation according to the invention is characterised in that the module has a vertical shaft, which is arranged centrally, surrounded by one or more feedstuff silo/silos, and that the silo/silos over a large portion of their height dimension have lower sidewall portions converging obliquely inwards and downwards, the shaft and the converging sidewall portions are terminated just above a feedstuff transfer hold at the bottom of the module, while module outside of the converging portions has an outer surface converging obliquely inwards and downwards.

According to the invention an advantageous internal arrangement is obtained in the module and in addition an advantageous external design of the module, so that the module can function effectively at sea even under severe weather and wind conditions. Inter alia a funnel-shaped outline of the silos is achieved internally in the module downwardly towards the feedstuff transfer hold, while in addition an equivalent frusto-conical outer side is obtained on a part of the module, which is exposed to significant loadings in so-called "heavy" seas, thereby to ensure the module great stability and low weight in a concentrated space. Furthermore a concentrated disposition of the feedstuff is obtained in annular form about a middle access shaft with the possibility for easy access to the drier space at the bottom of the module, where vital parts of the dosing and conveyor means can be placed.

By means of the feeding installation according to the invention there are possibilities to create a feeding installation which is especially reliable and operative at any time, that is to say a module which can be operated under difficult weather conditions in a reliable manner and with the possibility for effective supervision and effective repair where this is absolutely necessary.

Furthermore the afore-mentioned solution makes it possible to design the module in an especially compact manner, so that there can be obtained a low center of gravity and low freeboard, good stability, low total weight and good transport conditions plus good storage conditions for feedstuff.

The installation is further characterised in that the centrally arranged shaft of the module, which extends from the feedstuff transfer hold to just above the deck of the module, creates via an upper closeable hatch cover access to the dried space. There is hereby the possibility for effective individual inspection of the module over the whole of its height dimension.

The installation is additionally characterised in that the centrally arranged shaft of the module, which extends from the feed hold to just above the deck of the module, receives the conveyor pipe, which extends upwardly to the deck of the module, from which the feedstuff is adapted via transport hoses to be supplied to a respective one of the group of fish pools. There is hereby the possibility for an especially simple arrangement of electrical cables, conveyor pipes, and the like upwardly through the module independently of the silos.

According to the invention it is especially favourable that the outer surface of the module comprises an upper portion having vertical sides and a middle portion, whose sides converge obliquely downwards and inwards towards a lower portion with vertical sides. A module is hereby obtained which is especially well suited to locations of use exposed to weather and wind, the module thereby being moveable in an especially controlled, stabilised manner in vertical movements and in tilting and rocking movements in the ocean.

An especially advantageous solution consists in that the module is divided at an upper portion into a middle main section and two mutually opposite side sections, which are arranged on each respective side of the main section for defining the combined buoyancy chambers, machine rooms, service rooms or the like.

According to a preferred detailed construction the main section and side sections of the module are defined within a common upper portion having a square cross-section and having vertical outer walls, while an annular ballast-forming portion is arranged in the transition between teh vertically extending outer surface of the module and the outer surface converging obliquely downwards and inwards.

According to a preferred solution the feeding transfer hold is arranged on the under side of the silos, essentially within the outermost periphery of the silos. By such a solution there can be achieved the intended low weight, good stability and low center of gravity in addition to being able to obtain easy access to drive means of the feed transport arrangement and other vital components.

Furthermore it is advantageous according to the invention that extra storage space and other out compartments plus ballast-forming portions are arranged at the upper portion of the module laterally outside the silos.

Further features of the present invention will be evident from the following description having regard to the accompanying drawings, where a pair of alternative embodiments are shown and in which:

FIG. 3 shows the same as in FIG. 2 illustrated in plan view.

FIG. 4 shows the same as in FIG. 2 illustrated in schematic cross-sectional view.

FIG. 5 shows in perspective view a feeding installation according to a second construction according to the invention.

Figure 1:
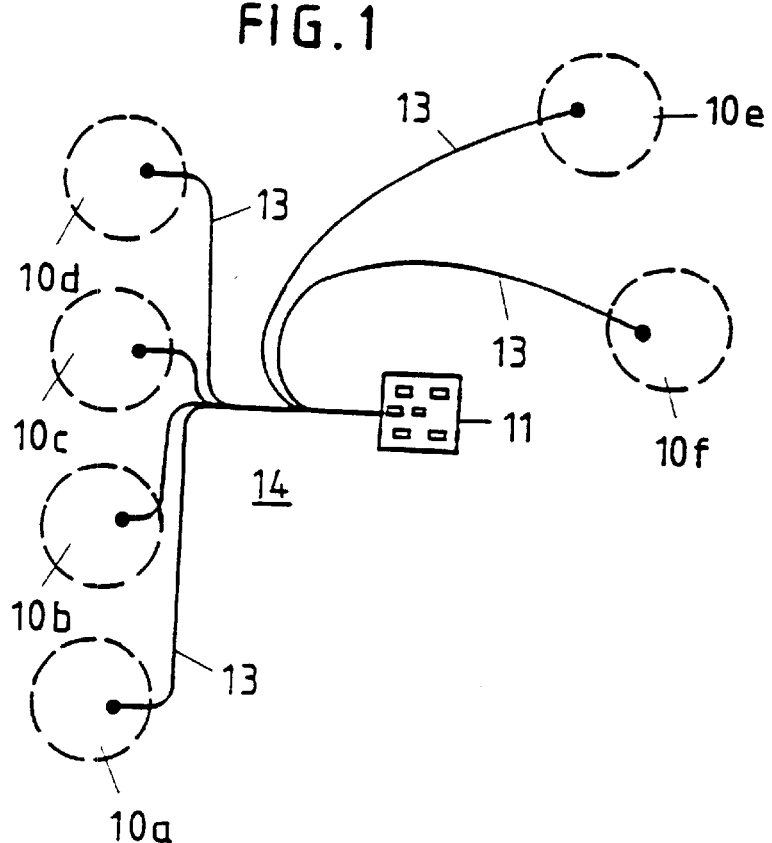
FIG. 1 shows in a schematic plan view a feeding installation according to the invention in combination with a series of separate fish pools.

In FIG. 1 there are schematically illustrated a group of six separate fish pools 10a–10f plus a common feeding installation 11, which separately floats on the surface of the sea and which is separately anchored to the sea bottom.

In the following description the main components of the feeding installation are designated as a module 12. The module is connected to the respective fish pools (pens) 10a–10f by means of its respective associated feedstuff transport hose 13.

Figure 2:
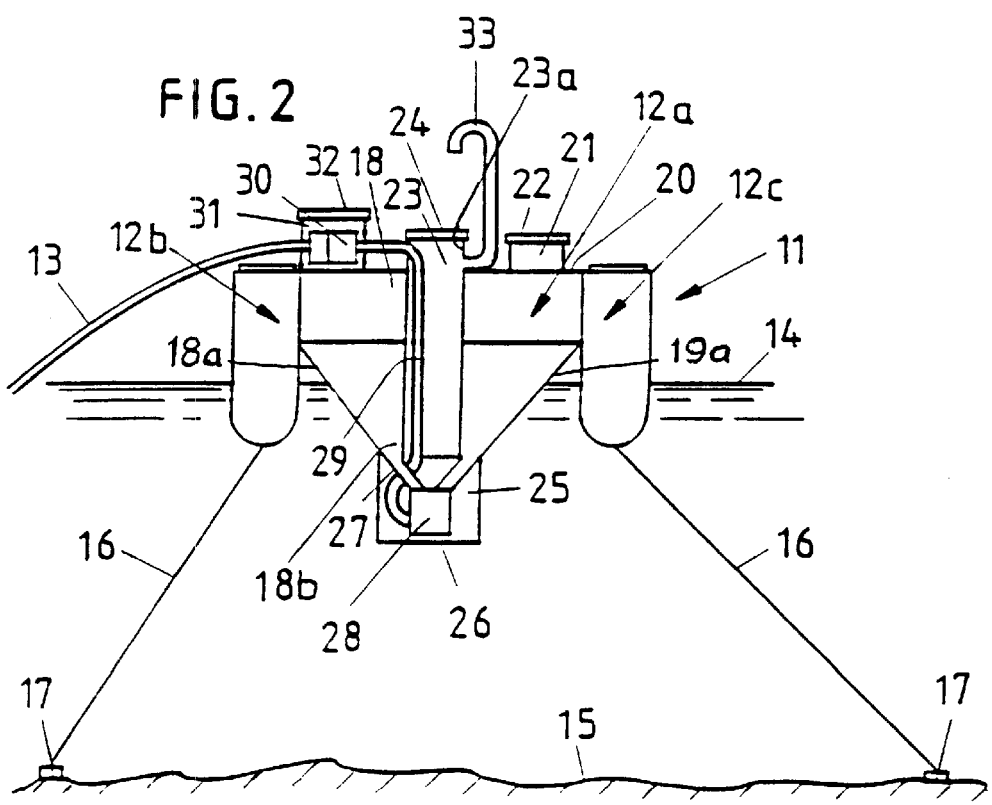
FIG. 2 shows partly in side view and partly in section the feeding installation according to a first construction according to the invention.

In FIGS. 2–4 there is shown a first embodiment of the module 12. In FIG. 2 the module 12 is shown in a relatively high-lying floating position, without filled feedstuff and floating on the surface 14 of the sea and anchored to the sea bottom by means of anchoring lines 16 having associated anchor fastenings 17.

The module 12 comprises, as is shown in FIGS. 2–4, a middle main section 12a and two side sections 12b and 12c, which are placed along opposite sides of the main section 12a. The aim is that the module can have a low freeboard and can have relatively little height above the ocean surface.

As in shown in FIG. 4, the main section 12a is divided into two separate silos 18 and 19. The silos can be employed for different feed sizes and the number of silos can for example be increased to four separate silos, if desired. Above, the silos 18,19 have rectangular cross-sections and below, have four obliquely downwardly converging sides 18a and 19a, to form a lower funnel-shaped silo portion. The silos 18,19 are extended a small distance upwardly above deck 20 of the module 12 with their respective coamings 21, upper openings of which are shown covered with an associated upswingable hatch cover 22.

Centrally in the module 12 a shaft 23 is arranged which is extended with a shaft portion 23a a distance upwardly above deck 20 of the module 12. The upper opening of the shaft portion 23a is shown covered by an upswingable cover 24. The shaft 23 and the silos 18,19 are terminated a distance above a box-shaped feedstuff transfer hold 25 at the bottom portion 26 of the main section 12. In the hold 25 connected to lower discharge openings 18b from the associated silo 18 there is arranged remotely controlled dosing equipment 27 for dosing feedstuff from a respective silo 18,19 directly into a common, remotely controlled feedstuff feeder 28. The feedstuff feeder 28 supplies feedstuff, for example by means of compressed air, through a conveyor pipe 29 via the hold 25 upwardly through the shaft 23 and further laterally outwards through the shaft wall to a remotely controlled distribution valve 30. From the distribution valve 30, the feedstuff is delivered further to each individual fish pool 10a–10f via their respective separate transport hoses 13.

The distribution valve 30 is received in a deck box 31 and is via a pivotable cover 32.

Correspondingly, the dosing equipment 27 and the feedstuff feeder 28 are accessible for inspection and possible repair from the hold 25 via the shaft 23. From upper portion 23a of the shaft 23 there projects upwards an air pipe 33 approximately C-shaped in vertical section.

Each of the side sections 12b,12c are provided with pivotable covers 34 and 35 which provide access to their respective dry chambers, which for example can form machine holds/service holds and can form storage holds for diverse equipment, residence holds for service, etc.

The combination of the upper box-shaped portion of the main section 12 and the adjacent middle main section portion of inverted frusto-conical shape, for storing feedstuff, ensures an optimum utilisation of the volume of the module in a concentrated manner with the possibility of effective flow for the feedstuff from a respective silo inwardly and downwardly towards the dosing and feed equipment in the box-shaped lower portion of the module 12, which contains the hold 25. The frusto-conical middle portion of the main section 12a ensures the module 12 especially good buoyancy conditions and stability relative to the movements of the sea. According to the invention a module 12 is obtained, which is especially low floating, that is to say as in a normal condition with filled silos (see FIG. 6) projects relatively deeply down in the sea with a low freeboard above the surface 14 of the sea and with minimum construction above deck 20 of the module. Consequently a module 12 is obtained, which in a low floating condition is exposed relatively little to weather and wind. During normal operative conditions it is also readily accessible for loading in feedstuff and for ready access to the interior of the module. In addition the transport hoses 13 extend outwardly from deck 20 of the module 12 at a low level above the surface 14 of the ocean.

With the module 12 according to the invention there is available a large storage capacity for feedstuff in the silos 18,19, which are concentrated in the middle main section 12a in annular form around the middle admission shaft 23. The hold 25 is arranged at the bottom portion 26 of the module 12 and consequently projects deepest down in the module in an extension of the shaft 23 and cooperates to give the module 12 great stability in the sea, especially in so-called "heavy" seas with large wave movements. The positioning of the side sections 12b and 12c at the upper portion of the module 12, along two sides of the main section 12a, increases the stability of the module 12 in the sea.

In FIGS. 5–9 a module 42 is shown according to a second embodiment. As is shown in FIG. 5 the module 42 represents a more practically adapted construction of the module 12, as is shown in FIGS. 2–4, that is to say certain details are somewhat modified for further practical adaptation to current locations of use which can be exposed to severe weather and wind forces.

Figure 6:
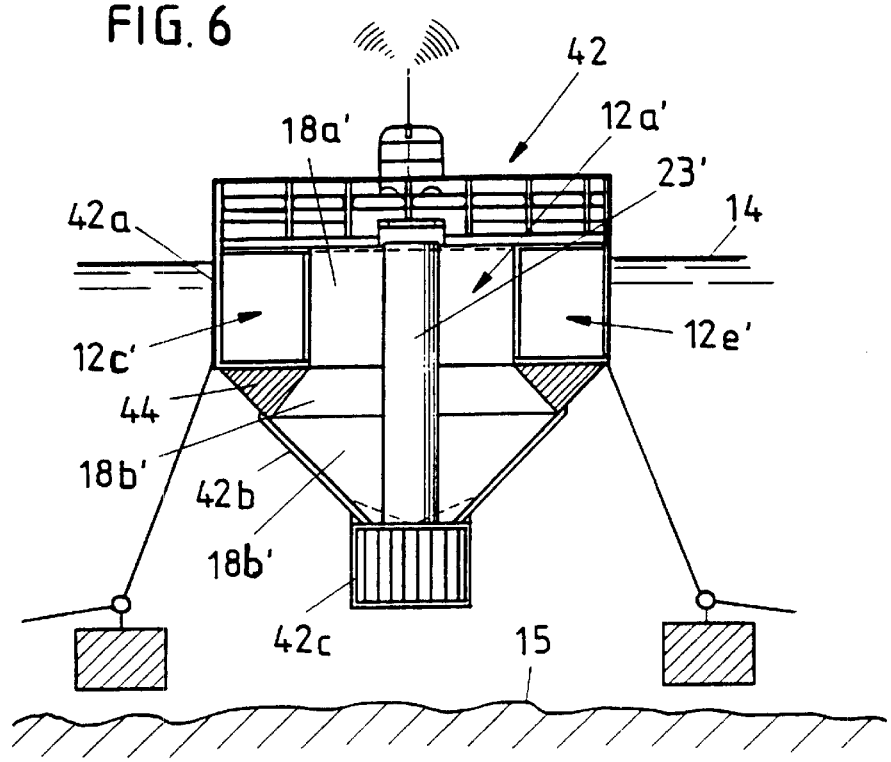
FIGS. 6 and 7 show in cross-section in two crossing vertical planes details of the feeding installation according to FIG. 5.
Figure 7:
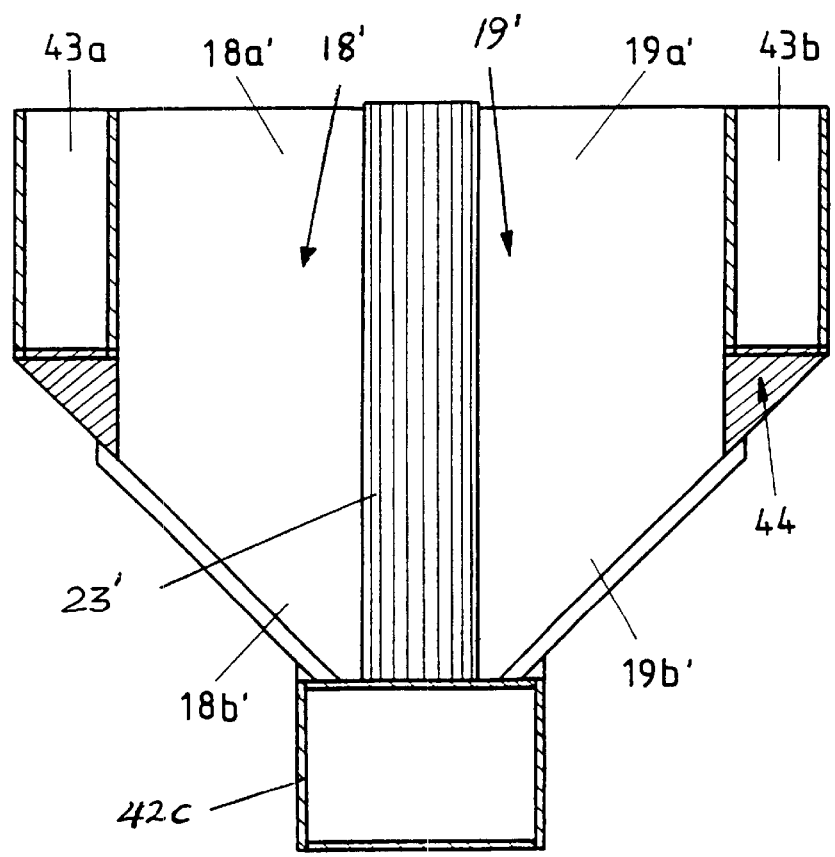

As is shown in FIGS. 6 and 7, according to the second embodiment, the side sections 12b' and 12c' and the main section 12a' are built into a concentrated square box shape at the upper portion 42a of the module. Provision is made for the major portion of the volume of the main section 12a' to be concentrated in the middle portion 42b of the module 42, while a minimum volume is arranged at the lower portion 42c of the module 42 to define a feedstuff transfer hold.

The silos 18' and 19' are shown schematically in FIG. 7 illustrated with an upper, elongate box-shaped portion 18a' and 19a' respectively and a lower, inverted frusto-conical portion 18b' and 19b' respectively. In the transition between the side sections 12b', 12c' and lower portions 18b', 19b' of the silos 18' and 19' (see FIG. 6) and between the storage hold 43a, 43b (see FIG. 7) at upper end portions of the silos 18',19' in the upper portion 18a',19a' and lower portions 18b',19b' of the silos 18',19', an annular ballast portion 44 is shown. The ballast portion 44 accordingly extends in a ring shape on the under side of an annular series of buoyancy-forming chambers which surround the silos 18',19' above.

As shown in FIG. 6 the silos 18' and 19' (in the drawing only illustrated for the silo 18') are provided with a middle downwardly extending portion 18c' on the under side of the sections 12b' and 12c'.

Figure 8:
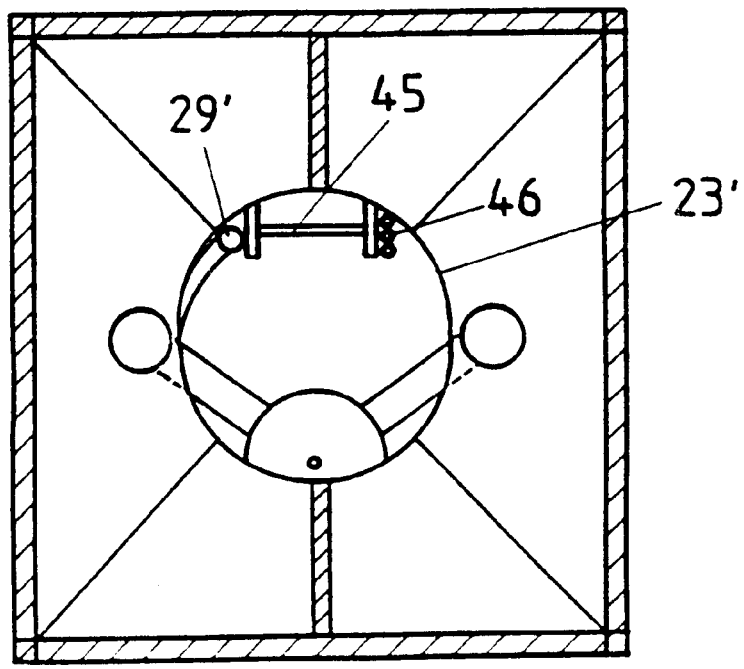
FIGS. 8 and 9 show in cross-section and in vertical section respectively segments of the lower portion of the module.
Figure 9:
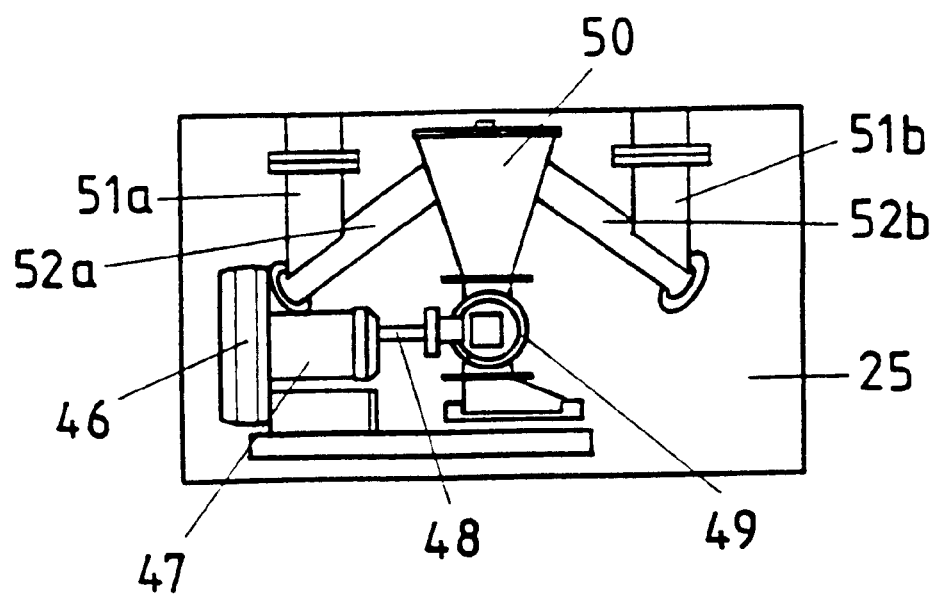

In FIGS. 8 and 9 there are shown details of the hold 25.

In FIG. 8 a cylindrical shaft 23' is shown, which is defined just above and which empties below into the dry hold 25. There is illustrated in the shaft 23' a ladder 45 for use for attending to access to the hold 25. On opposite side walls of the ladder 45 there are shown electrical cables 46 and a transport pipe 29' for conveying feedstuff to the distribution valve on deck 20 of the module 42. The transport pipe 29 is connected to a pump 46, which is driven by an electrically driven motor 47 (see FIG. 9). The pump 46 is supplied with a mixture of compressed air and feedstuff via a suction pipe 48, which is connected to a mixing arrangement 49, which is supplied with compressed air and feedstuff separately. The mixing arrangement 49 is supplied with feedstuff via a feed funnel 50 from a respective one of the silos 18',19' via a respective vertical feed pipe 51a and 51b and their respective feed screen (not shown further) in each respective feed pipe 52a,52b.

What is claimed is:

1. A floating feeding installation comprising
   a module having a downwardly directed frusto-conical middle portion defining at least one silo for receiving feedstuff, said silo having an upwardly opening intake at an upper end for receiving feedstuff and an outlet in a lower end for discharging feedstuff;
   a feedstuff transfer hold below said outlet of said silo;
   a vertical shaft disposed centrally of and within said module and above said feedstuff transfer hold;
   a conveyor pipe extending upwardly from said feedstuff transfer hold and within said vertical shaft for communication with a transport hose for delivering feedstuff to a fish pen; and
   remotely controlled dosing equipment in said feedstuff transfer hold for dosing feedstuff from said outlet of said silo into said conveyor pipe.

2. A floating feedstuff installation as set forth in claim 1 wherein said module defines at least a pair of said silos, each silo having a downwardly directed funnel shape and wherein said vertical shaft is disposed between said silos.

3. A floating feedstuff installation as set forth in claim 2 wherein said module has a deck and said vertical shaft extends vertically above said module deck and has a closeable hatch cover thereon, said shaft being sized to provide access for personnel to said feedstuff transfer hold.

4. A floating feedstuff installation as set forth in claim 1 wherein said module defines a pair of said silos, each silo having a lower funnel-shaped portion and wherein said vertical shaft is disposed between said silos.

5. A floating feeding installation comprising
   a module having a middle main section and a pair of side sections on opposite sides of said middle section to define holds;
   said module main section having a downwardly directed frusto-conical shape and defining a pair of silos therein for receiving feedstuff, each silo having an intake at an upper end for receiving feedstuff and an outlet at a lower end for discharging feedstuff;
   a feedstuff transfer hold below said silos;
   a vertical shaft disposed within said module between said silos and above said feedstuff transfer hold;
   a conveyor pipe extending upwardly from said feedstuff transfer hold and within said vertical shaft for communication with a transport hose for delivering feedstuff to a fish pen; and
   remotely controlled dosing equipment in said feedstuff transfer hold for dosing feedstuff from said outlet of a respective silo into said conveyor pipe.

6. A floating feedstuff installation as set forth in claim 5 wherein said module has a deck and said vertical shaft extends vertically above said module deck and has a closeable hatch cover thereon, said shaft being sized to provide access for personnel to said feedstuff transfer hold.

7. A floating feedstuff installation as set forth in claim 5 further comprising a distribution valve on said module communicating with said conveyor pipe to selectively deliver feedstuff to a plurality of transport hoses.

8. A floating feeding installation comprising
   a module having a box-shaped upper portion having a pair of side sections to define holds, a lower portion defining a feedstuff transfer hold and a funnel-shaped portion above said lower portion having a pair of silos to receive feedstuff therein;
   a vertical shaft disposed within said module between said silos and above said feedstuff transfer hold;
   at least one conveyor pipe extending upwardly from said feedstuff transfer hold and within said vertical shaft for communication with a transport hose for delivering feedstuff to a fish pen; and
   dosing equipment in said feedstuff transfer hold for dosing feedstuff from said silos into at least one said conveyor pipe.

9. A floating feedstuff installation as set forth in claim 8 wherein said module defines annularly disposed buoyancy-forming chambers about said silos.

10. A floating feedstuff installation as set forth in claim 9 which further comprises a ring-shaped ballast portion about said module and below said buoyancy-forming chambers.

11. A floating feedstuff installation as set forth in claim 8 wherein said vertical shaft is disposed centrally of said module.

12. A floating feeding installation comprising
    a module having a downwardly directed frusto-conical middle portion defining at least one silo for receiving feedstuff, said silo having an upwardly opening intake at an upper end for receiving feedstuff and an outlet in a lower end for discharging feedstuff;
    a feedstuff transfer hold communicating with said outlet of said silo;

a shaft disposed within said module and sized to provide access to said feedstuff transfer hold;

at least one conveyor pipe extending upwardly from said feedstuff transfer hold and within said module for communication with a transport hose for delivering feedstuff to a fish pen; and remotely controlled dosing equipment in said feedstuff transfer hold for dosing feedstuff from said outlet of said silo into said at least one conveyor pipe.

13. A floating feedstuff installation as set forth in claim 12 wherein said module defines at least a pair of silos, each silo having a downwardly directed funnel-shape and wherein said shaft is disposed between said silos.

14. A floating feedstuff installation as set forth in claim 12 wherein said module defines a pair of said silos, each silo having a lower funnel-shaped portion and wherein said shaft is disposed between said silos.

15. A floating feedstuff installation comprising a module having a middle main section and a pair of side sections on opposite sides of said middle section to define holds;

said module main section having a downwardly directed frusto-conical shape and defining a pair of silos therein for receiving feedstuff, each silo having an intake at an upper end for receiving feedstuff and an outlet at a lower end for discharging feedstuff;

a feedstuff transfer hold below said silos;

a vertical shaft disposed within said module between said silos and above said feedstuff transfer hold;

at least one conveyor pipe extending upwardly from said feedstuff transfer hold and within said vertical shaft for communication with a transport hose for delivering feedstuff to a fish pen; and remotely controlled dosing equipment in said feedstuff transfer hold for dosing feedstuff from said outlet of a respective silo into said at least one conveyor pipe.

16. A floating feedstuff installation as set forth in claim 15 further comprising a distribution valve on said module communicating with said at least one conveyor pipe to selectively deliver feedstuff to a plurality of transport hoses.

* * * * *